M. F. FLYNN

Aug. 30, 1932. APPARATUS FOR CLEANING AND CONDITIONING FABRICS Re. 18,583

Original Filed April 26, 1928 2 Sheets-Sheet 1

INVENTOR,
Mortimer F. Flynn,
BY
Henry J. Lucks,
ATTORNEY.

M. F. FLYNN

Aug. 30, 1932. APPARATUS FOR CLEANING AND CONDITIONING FABRICS Re. 18,583

Original Filed April 26, 1928 2 Sheets-Sheet 2

INVENTOR,
Mortimer F. Flynn,
BY
Henry J. Locke,
ATTORNEY.

Reissued Aug. 30, 1932 Re. 18,583

UNITED STATES PATENT OFFICE

MORTIMER F. FLYNN, OF GRANT CITY, NEW YORK

APPARATUS FOR CLEANING AND CONDITIONING FABRICS

Original application filed April 26, 1928, Serial No. 272,967. Renewed July 25, 1931. Original No. 1,847,870, dated March 1, 1932. Application for reissue filed June 30, 1932. Serial No. 620,213.

The invention relates to apparatus for cleaning and conditioning fabrics such as carpets, rugs, blankets, etc.

More particularly it relates to combined means for opening, raising or straightening the pile of pile fabrics or raising or renewing the nap of other fabrics, and at the same time freeing or rendering more accessible dust and dirt therein, and thereupon extracting the dust or dirt by vacuum treatment, the efficiency of which is greatly increased by the conditioning operation.

To these ends, the invention comprises, as broadly described, vacuum cleaning mechanism including an exhaust blower and suction nozzle and usually provided with means such as wheels for traversing it over the fabric such as a rug or carpet, and napping or pile raising mechanism including a roll having metallic, burred napping or pile raising bristles and arranged in relation to the suction nozzle so that when the latter is traversed over the fabric, the bristles first act upon the fabric to open up its weft or woof, or to raise, straighten and open the pile of the fabric, and at the same time loosen any embedded or matted extraneous matter such as dust or dirt, whereupon the draft of air entering the suction nozzle more efficiently takes up and removes such extraneous material.

In preferred forms of the invention, a bristle-aligning or straightening bar is provided and this is also desirably arranged as sharpening means to sharpen or renew the bristle burrs. The napping cylinder is also desirably movably supported in relation to the head or suction nozzle of the vacuum mechanism, and provided with means acting automatically to lower the cylinder to active position when the apparatus is advanced upon the fabric and to retract or raise the cylinder to a non-operative position when the apparatus is retracted.

I also provide novel and improved means for continuously cleaning the napping cylinder (or bristles), such means including in a preferred example a cleaner or comb which removes extraneous matter from the bristles, and a stripper acting at frequent intervals to clean the comb.

The invention is capable of physical embodiment as a complete machine, or it may be embodied by applying to or combining with a vacuum cleaner of any known, standard or suitable type, the napping cylinder and other elements of the fabric-conditioning mechanism.

The characteristics and advantages of the invention are further sufficiently explained in connection with the following detail description of the accompanying drawings, which show one representative embodiment. After considering this example, skilled persons will understand that many variations may be made without departing from the principles disclosed, and I contemplate the employment of any structures that are properly within the scope of the appended claims.

Figure 1:
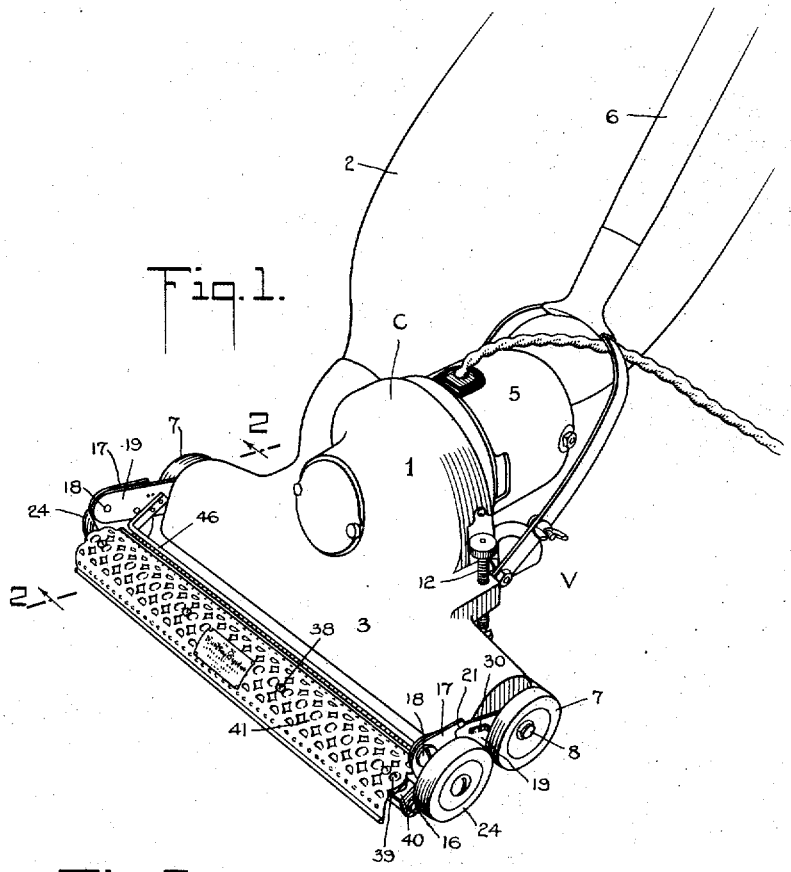
Fig. 1 is a perspective view of apparatus embodying the invention in one form.

In the present particular example, the conditioning mechanism is combined with or applied to a vacuum cleaner V of known or standard type of which the casing C has a part 1 enclosing the exhaust fan or blower, discharging into a bag 2 and connected to the vacuum head 3, the lower face of which is formed with the vacuum or suction nozzle 4. The motor casing 5 is connected at the rear of casing portion 1 and a handle or handle shaft 6 is also connected to the casing. The casing or especially the vacuum head is supported at proper elevation above the fabric such as a carpet or rug by wheels 7 revolving on stub shafts 8 which are connected to arms 9 pivotally mounted on ends of the suction head at 10. The arms are connected at the rear of the head by a cross-piece 11, and adjusting means such as the screw 12 is provided to regulate the height of the nozzle by pivotal movement of the frame including arms 9 and cross-piece 11.

Figure 5:
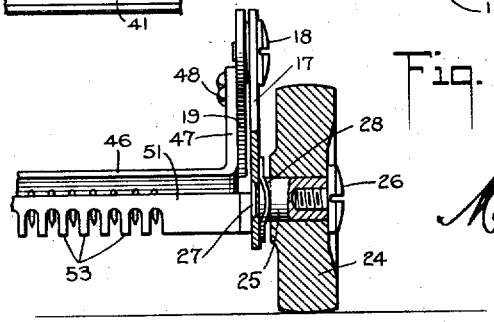
Fig. 5 is a sectional detail on 5—5, of Fig. 4.

The conditioning apparatus includes as a principal feature the napping or conditioning roll 15 revolubly mounted in advance of the suction head and also preferably arranged for vertical movement under control of the advancing and retracting movements of the apparatus. I may employ any suitable fabric conditioning or napping roll or cylinder such as the various devices of this class of my invention. In the present example, the roll structure includes a core or shaft 16, the ends of which are revolubly mounted in bearings in side plates or brackets 17. The brackets are pivotally connected at 18 to the forward ends of arms 19, and these arms are fixedly connected by screws or studs 20 to the arms 9 of the vacuum apparatus. Rearward edges of the brackets 17 are provided with shoulders or stops 21 and 22 co-operating with pins 23 fixed in arms 19 to limit the upward and downward swinging movements of the brackets and the conditioning roll which they support. The swinging frame or mechanism including the brackets and the conditioning roll are supported and controlled by wheels 24 revolubly mounted on stub shaft 25 and secured thereon by screws 26. The inner ends of the stub shafts are secured in brackets 17 as at 27, Fig. 5, and friction means is provided such as the spring washers 28 located between the brackets and the wheels, tending to retard the rotation of the wheels in relation to the brackets and by this frictional reaction upon the brackets, the frame is caused to rotate counterclockwise as viewed in Fig. 2 and bring the bristles of the conditioning roll in contact with the fabric and maintain them firmly in proper contact, during advancing movement of the apparatus; and when the apparatus is retracted or moved to the right as viewed in Fig. 3, the frictional drag acting upon the brackets raises the frame and roll 16 clear of the fabric and maintains them in this position until the apparatus is again advanced for a cleaning action.

Means may be provided such as a stop 30 slidably mounted on one of the arms 19 and engageable above the shoulder member 21, to maintain the swinging frame and roll in upward, inactive position while the apparatus is not in use.

The body 16 of the conditioning roll is provided with a multiplicity of uniformly arranged and spaced bristles 35 which may be of different forms or arrangements and secured to the roll body in various ways including the forms or arrangements shown in my U. S. Patent No. 1,583,587, and pending applications. The bristles may be angularly bent or straight; as shown in the present example, wherein the bristles are arranged angularly in relation to radii of the roll and also inclined forwardly with respect to the active or forward motion of the apparatus, that is to the left as viewed in Fig. 2. At the end of each bristle is a tooth or burr 36, these being directed approximately at a right angle to the lower portion of the bristles and also directed forwardly in relation to their active contact with the fabric; that is the burrs project to the left ahead of their respective bristles as they engage the fabric F when the apparatus is advanced in the opposite direction.

Means is provided for positioning or straightening the bristles, such means consisting in this example of a transverse bar 37 located above the roll and in contact with the ends of the bristles and adjustably mounted as by screws 38 and 39 on lugs or ears 40 which are in-bent members on brackets 17. Preferably the under face of bar 37 is of abrasive character such as a file surface, so that as the conditioning roll revolves in a counterclockwise direction in the advancing movement of the apparatus, the ends of the bristles drag across this abrasive surface, which restores or sharpens the burr formations and at the same time properly aligns or positions such bristles. Any injury to the bristles which might be caused by reverse rotation of the roll is prevented by the automatic roll elevating action when the apparatus is moved reversely, as sufficiently explained above.

A guard 41 is desirably placed above and about the roll to prevent improper contact of the bristles with other objects, this guard being in the form of a part-cylindrical, perforated metal sheet secured in position by the screws 38 or 39.

I also preferably provide cleaning means for keeping the bristles continually clear of dust, dirt or other extraneous matter, removed from the fabric. Such means consists in the present example of a comb including teeth 45 secured at regularly spaced intervals in a cross-bar 46 supported by arms 47 fixedly secured to arms 19 as by screws 48. The forward ends of the teeth, between which the bristles pass are preferably bent slightly downward as at 50 to more effectively scrape from the bristles the extraneous matter thereon, some of which will drop to the fabric surface for subsequent removal by the air draft. Some of this material will however accumulate in the comb and to periodically remove such material from the comb I provide a stripper consisting of a cross-bar 51 having laterally bent ends 52 rigidly secured to brackets 17 and having on its lower face teeth 53 interfitting with the teeth of the comb. Whenever the frame including bracket 17 is elevated in a retractive movement of the apparatus, the stripper teeth 53 are moved upward or to the left in relation to the comb teeth as viewed in Fig. 2, to the position shown in Fig. 3, where the stripper teeth are entirely clear of the comb and in such movement the comb is cleared of extraneous material.

Figure 2:
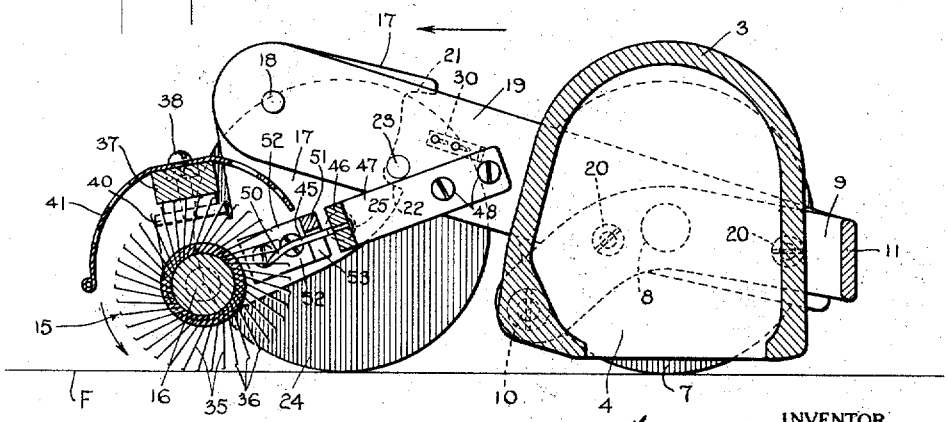
Fig. 2 is a section in a longitudinal plane of the apparatus.
Figure 3:
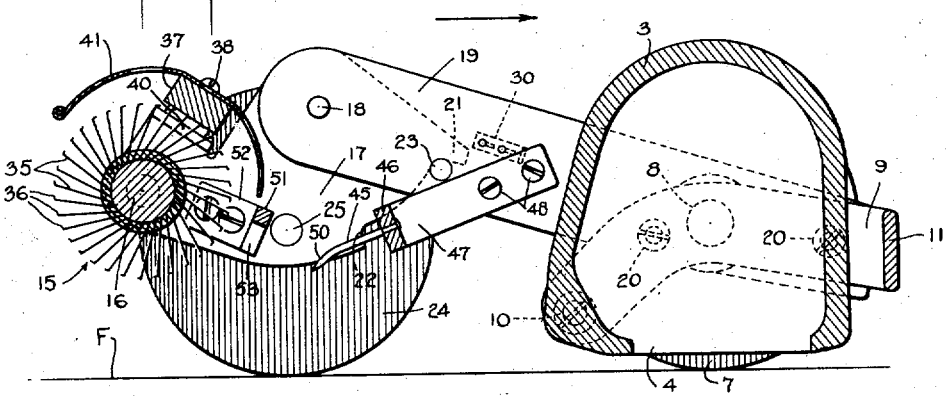
Fig. 3 is a similar section showing a different position of the parts.
Figure 4:
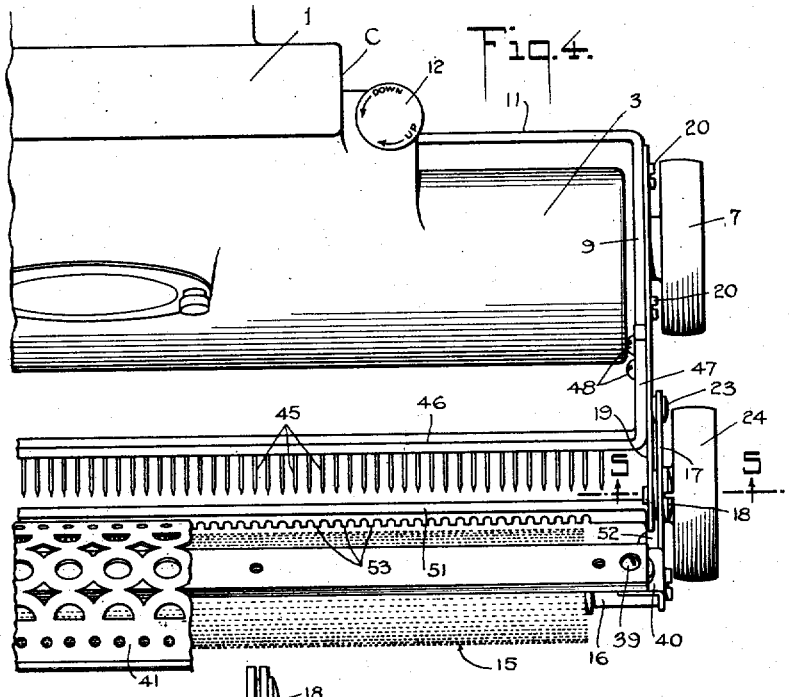
Fig. 4 is a half plan view of the machine with some parts broken away.

In operation, the motor of the vacuum apparatus is put into operation as usual, and the apparatus is pushed to the left over the fabric such as a rug or carpet, as indicated by the arrow in Fig. 2. At the beginning of this movement, the napping roll is automatically lowered and held in proper firm contact with the fabric in the manner above explained. The roll then rotates counterclockwise with resistance to such rotation provided by the bar 37 in contact with the upward bristles, and the lower bristles enter into the pile of the fabric and engage the weft threads thereof and as the bristles rise out of contact with the fabric they properly separate, elevate and restore the pile to its proper upright position and at the same time loosen or practically pick from the fabric any embedded or encrusted foreign material; and immediately thereafter the suction head passing over the conditioned surface removes the dust and dirt therefrom with greatly increased efficiency due to the fabric conditioning and dirt loosening action of the roll 16. During such movement the teeth or burrs 36 are continually renewed or sharpened by the abrasive surface of bar 37 and the comb 46 also continually cleans the bristles as above described. At the beginning of reverse movement of the apparatus the roll is automatically elevated and remains in elevated position free from contact with the fabric until the beginning of the next advance movement of the apparatus. In the elevating movement of the roll, the comb is stripped or cleaned as also above explained.

My invention provides for positively and mechanically separating, raising, straightening and restoring the pile without removing any substantial part of it or causing any injury to the fabric and in fact, the condition of rugs and carpets is materially improved while the natural pile surface is being effectively restored and at the same time the fabric surface is placed in proper condition for the effective extraction therefrom of dust and dirt by the vacuum draft.

The apparatus is also valuable for cleaning and restoring the nap of such fabrics as blankets, and it may also be embodied in or applied to vacuum cleaning apparatus of other types, such as small "hand" devices and in such cases may be used effectively for cleaning and re-napping garments, etc.

It will be observed from the provision of means of my aforesaid invention, that any depressed portion of the pile of a carpet or the nap of fabric in general is restored to its predetermined normal height above the warp and woof woven structure of the same, and similarly in the event of worn off portions of the pile or the nap, the bristles of the napping roll serve to re-create the pile or the nap by the action of the burred ends of the bristles on the warp and woof strands. Such restoration and renewal actions are definitely controlled by the predetermined factors of the construction of the bristles and their burred ends, and in particular the definite height to which the depressed portions and the renewed portions of the pile or nap are raised above the warp and woof structure of the carpet or other fabric.

Whereas I have described my invention by reference to specific forms thereof, it will be understood that many changes and modifications may be made without departing from the spirit of the invention.

I claim:

1. In combination with vacuum cleaning apparatus, a fabric conditioning roll arranged to contact with a fabric in advance of the vacuum suction nozzle in the active direction of movement and comprising a multiplicity of burred bristles engaging the fabric to open and restore the surface structure thereof and increase the effectiveness of the vacuum action.

2. In combination with vacuum cleaning apparatus including a suction head having a nozzle, a fabric conditioning roll revolubly mounted in relation to said apparatus, said roll including a multiplicity of burred bristles, and means actuated by movement of the apparatus in opposite directions to lower the roll to contact with a supporting fabric and to raise the roll from contact therewith.

3. In combination with vacuum cleaning apparatus including a suction head having a nozzle adjacent a supporting surface, a fabric conditioning mechanism including a conditioning roll revolubly mounted in advance of said head and also supported for vertical movement, means acting in one direction of movement of the apparatus to lower the conditioning roll into engagement with the fabric and in the other direction to elevate the roll free from the fabric, said roll lowering and elevating means including supporting wheels for said conditioning roll, the conditioning roll being provided with a plurality of burred bristles, and a bar in contact with the bristles serving as a roll retarder.

4. In combination with the suction head of vacuum cleaning apparatus, brackets pivotally mounted in relation to said head, a conditioning roll revolubly mounted in the brackets, wheels carried by the brackets, and means actuated by rotation of said wheels in opposite directions to oscillate the brackets and move the roll upward and downward in relation to a supporting surface.

5. In combination with the suction head of vacuum cleaning apparatus, brackets pivotally mounted in relation to said head, a conditioning roll revolubly mounted in the brackets, wheels carried by the brackets, and means actuated by rotation of said wheels in opposite directions to oscillate the brackets and move the roll upward and downward in relation to a supporting surface, the conditioning roll having a multiplicity of burred bristles.

6. In combination with the suction head of vacuum cleaning apparatus, brackets pivotally mounted in relation to said head, a conditioning roll revolubly mounted in the brackets, wheels carried by the brackets, means actuated by rotation of said wheels in opposite directions to oscillate the brackets and move the roll upward and downward in relation to a supporting surface, and means for releasably retaining the roll in upward position.

7. In combination with cleaning apparatus, a fabric conditioning roll arranged to contact with a fabric in advance of the cleaning apparatus in the active direction of movement and comprising a multiplicity of burred bristles engaging the fabric to open and restore the surface structure thereof and increase the effectiveness of the cleaning action.

8. In combination with cleaning apparatus, a head, brackets pivotally mounted in relation to said head, a conditioning roll revolubly mounted in the brackets, wheels carried by the brackets, and means actuated by rotation of said wheels in opposite directions to oscillate the brackets and move the roll upward and downward in relation to a supporting surface.

9. In combination with cleaning apparatus, a head, brackets pivotally mounted in relation to said head, a conditioning roll revolubly mounted in the brackets, wheels carried by the brackets, and means actuated by rotation of said wheels in opposite directions to oscillate the brackets and move the roll upward and downward in relation to a supporting surface, the conditioning roll having a multiplicity of burred bristles.

10. In combination with cleaning apparatus, a head, brackets pivotally mounted in relation to said head, a conditioning roll revolubly mounted in the brackets, wheels carried by the brackets, means actuated by rotation of said wheels in opposite directions to oscillate the brackets and move the roll upward and downward in relation to a supporting surface, and means for releasably retaining the roll in upward position.

I testimony whereof I have signed this specification this 22d day of June, 1932.

MORTIMER F. FLYNN.